United States Patent
Bardts

(10) Patent No.: US 10,647,897 B2
(45) Date of Patent: May 12, 2020

(54) RAPID CURING AND HIGH THIXOTROPY EPOXY ADHESIVE COMPOSITIONS

(71) Applicant: 3M INNOVATIVE PROPERTIES COMPANY, St. Paul, MN (US)

(72) Inventor: Mareike Bardts, Hilden (DE)

(73) Assignee: 3M Innovative Properties Company, St. Paul, MN (US)

( * ) Notice: Subject to any disclaimer, the term of this patent is extended or adjusted under 35 U.S.C. 154(b) by 176 days.

(21) Appl. No.: 15/770,876

(22) PCT Filed: Oct. 21, 2016

(86) PCT No.: PCT/US2016/058107
§ 371 (c)(1),
(2) Date: Apr. 25, 2018

(87) PCT Pub. No.: WO2017/074810
PCT Pub. Date: May 4, 2017

(65) Prior Publication Data
US 2018/0305595 A1  Oct. 25, 2018

(30) Foreign Application Priority Data
Oct. 29, 2015 (EP) .................................. 15192110

(51) Int. Cl.
| | | |
|---|---|---|
| C09J 163/00 | (2006.01) | |
| C09J 11/08 | (2006.01) | |
| C09J 11/04 | (2006.01) | |
| C08J 5/00 | (2006.01) | |
| C08L 63/00 | (2006.01) | |
| C08G 59/68 | (2006.01) | |
| C08G 59/50 | (2006.01) | |
| C09J 5/04 | (2006.01) | |

(52) U.S. Cl.
CPC ............ *C09J 163/00* (2013.01); *C08G 59/50* (2013.01); *C08G 59/68* (2013.01); *C09J 5/04* (2013.01); *C09J 11/04* (2013.01); *C09J 11/08* (2013.01); *C09J 2409/00* (2013.01); *C09J 2463/00* (2013.01)

(58) Field of Classification Search
CPC ....... C09J 5/00; C09J 5/06; C09J 11/04; C09J 11/08; C09J 163/00; C08L 63/00
USPC .................... 156/330; 523/427, 428, 457
See application file for complete search history.

(56) References Cited

U.S. PATENT DOCUMENTS

| | | | |
|---|---|---|---|
| 2011/0039108 A1* | 2/2011 | Goeb | C09J 163/00 |
| | | | 428/414 |
| 2012/0024477 A1 | 2/2012 | Kropp | |
| 2019/0241778 A1* | 8/2019 | Heintz | C08K 3/016 |
| 2019/0284453 A1* | 9/2019 | Heintz | C09J 11/08 |

FOREIGN PATENT DOCUMENTS

| | | |
|---|---|---|
| EP | 2223966 | 9/2010 |
| EP | 2310436 | 4/2011 |
| EP | 2402394 | 1/2012 |
| WO | 2010-091072 | 8/2010 |
| WO | 2010-097051 | 9/2010 |

OTHER PUBLICATIONS

International Search Report for PCT International Application No. PCT/US2016/058107, dated Jan. 18, 2017, 4 pages.

\* cited by examiner

*Primary Examiner* — Michael J Feely
(74) *Attorney, Agent, or Firm* — Philip P. Soo

(57) ABSTRACT

The present disclosure is directed to a precursor composition for a curable adhesive, the precursor comprising: a) a part (A) comprising: i. a first epoxy curing agent comprising at least one polyether amine and having an amine equivalent weight of at least 45 grams per mole of amine equivalents; ii. a second epoxy curing agent distinct from the first epoxy curing agent; iii. a metal nitrate catalyst; iv. optionally, a metal triflate catalyst; and b) a part (B) comprising: i. an epoxy resin; ii. a filler material; iii. an epoxy-based reactive diluent; and iv. optionally, a core-shell polymer toughening agent; and wherein the amount of filler material is selected such as to provide the part (B) with a hysteresis area of at least 30 Pa×1/s, when measured at 23 C according to the test method described in the experimental section. The compositions of the present disclosure are particularly suitable for use in structural bonding applications, in particular for adhesively bonding small parts in manufacturing operations in aeronautic and aerospace industries. The present disclosure also relates to method of using such epoxy resin based curable compositions.

12 Claims, No Drawings

RAPID CURING AND HIGH THIXOTROPY EPOXY ADHESIVE COMPOSITIONS

CROSS REFERENCE TO RELATED APPLICATIONS

This application is a national stage filing under 35 U.S.C. 371 of PCT/US2016/058107, filed Oct. 21, 2016, which claims the benefit of EP Patent Application No. 15192110.3, filed Oct. 29, 2015, the disclosures of which are incorporated by reference in their entirety herein.

TECHNICAL FIELD

The present disclosure relates generally to epoxy resin based curable compositions, more specifically to the field of epoxy resin based curable adhesive compositions. The compositions of the present disclosure are particularly suitable for use in structural bonding applications, in particular for adhesively bonding small parts in manufacturing operations in aeronautic and aerospace industries. The present disclosure also relates to method of using such epoxy resin based curable compositions.

BACKGROUND

Structural adhesives are adhesive compositions that can bond materials with a mechanical strength comparable to mechanical fasteners. They may be used to replace or augment conventional joining techniques such as welding, brazing or mechanical fasteners, such as nuts and bolts, screws and rivets. In particular, in the transportation and construction industries, structural adhesives can present a light weight support of or even an alternative to mechanical fasteners.

Epoxy resin based compositions have been long known for their good adhesive and mechanical properties and have been widely used as bonding agents in a variety of applications. Many of these compositions contain latent curatives (for example dicyandiamides, anhydrides or aromatic amines, such as for example diaminodiphenyl sulfone) and require high temperatures for curing the adhesive composition. Such adhesive systems are referred to as "one-component systems". Other epoxy adhesive formulations with more reactive curing agents can be cured at lower temperatures. Such systems are referred to as "two-component systems", because at least the majority of the epoxy resins are kept separated from the curing agents to avoid premature cross-linking. The two parts are combined upon application of the adhesive to initiate the curing reaction.

Small parts or objects, such as e.g. brackets, are frequently used for manufacturing operations in construction, automotive, aeronautics or aerospace industries. Small parts such as brackets are generally adhesively fixed within the interior of aircrafts so as to provide e.g. supporting means for cables. Due to the multitude of these small parts, the adhesive compositions used for their adhesive bonding shall provide specific performance requirements such as room temperature and fast curing, mainly because these small parts generally have to be applied manually.

Examples of room-temperature curable structural adhesive compositions used for adhesive bonding operations in aeronautic and aerospace industries are described e.g. in EP 2 402 394 (Wu et al.).

In manufacturing operations for construction, automotive, aeronautics or aerospace industries, it is often required that small parts such as brackets are capable of being adhesively bonded to surfaces which are inclined, vertical or overhead. Known structural adhesive compositions which are used for such bonding operations of small parts are typically used in combination with supporting fixtures, whereas the supporting fixture is meant to temporarily hold in place the assembly consisting of the small part and the adhesive composition until the later exhibits an acceptable adhesive strength. The supporting fixtures used in combination with existing adhesive compositions are for one application and are therefore disposed of after usage.

Without contesting the technical advantages associated with the adhesive compositions known in the art for bonding small parts such as brackets, there is still a strong need for rapid curing adhesive curable compositions suitable for use in structural bonding applications, which can advantageously replace the known compositions and obviate the need to use additional supporting fixtures during the adhesive bonding operations.

Other advantages of the structural adhesives and methods of the invention will be apparent from the following description.

SUMMARY

According to one aspect, the present disclosure relates to a precursor composition for a curable adhesive, the precursor comprising:
a) a part (A) comprising:
   i. a first epoxy curing agent comprising at least one polyether amine and having an amine equivalent weight of at least 45 grams per mole of amine equivalents;
   ii. a second epoxy curing agent distinct from the first epoxy curing agent;
   iii. a metal nitrate catalyst;
   iv. optionally, a metal triflate catalyst; and
b) a part (B) comprising:
   i. an epoxy resin;
   ii. a filler material;
   iii. an epoxy-based reactive diluent; and
   iv. optionally, a core-shell polymer toughening agent;
and wherein the amount of filler material is selected such as to provide the part (B) with a hysteresis area of at least 30 Pa×1/s, when measured at 23° C. according to the test method described in the experimental section.

In another aspect, the present disclosure relates to a method of bonding an article to a substrate, wherein the method comprises the step of:
a) providing a precursor composition for a curable adhesive as described above;
b) combining part (A) and part (B) so as to form a curable adhesive composition;
c) applying the curable adhesive composition to at least part of the surface of the article and/or to the substrate;
d) adhesively contacting the article to the substrate via the curable adhesive composition; and
e) allowing the curable adhesive composition to cure.

According to still another aspect, the present disclosure relates to the use of a precursor composition as described above for industrial applications, in particular for manufacturing and repairing operations in construction, automotive, aeronautics or aerospace industries.

DETAILED DESCRIPTION

According to a first aspect, the present disclosure relates to a precursor composition for a curable adhesive, the precursor comprising:

a) a part (A) comprising:
   i. a first epoxy curing agent comprising at least one polyether amine and having an amine equivalent weight of at least 45 grams per mole of amine equivalents;
   ii. a second epoxy curing agent distinct from the first epoxy curing agent;
   iii. a metal nitrate catalyst;
   iv. optionally, a metal triflate catalyst; and
b) a part (B) comprising:
   i. an epoxy resin;
   ii. a filler material;
   iii. an epoxy-based reactive diluent; and
   iv. optionally, a core-shell polymer toughening agent;
and wherein the amount of filler material is selected such as to provide the part (B) with a hysteresis area of at least 30 Pa×1/s, when measured at 23° C. according to the test method described in the experimental section.

In the context of the present disclosure, it has surprisingly been found that a curable composition as described above provides fast curing at room temperature while providing excellent overall thixotropic characteristics, which makes it outstandingly suitable for use in structural bonding applications, in particular for adhesively bonding small parts such as brackets, without the need to use supporting fixtures including in those situations where the small parts such as brackets are adhesively bonded to surfaces which are inclined, vertical or overhead.

It has in particular been found that this is due to the specific and unique combination of a part (A) comprising a first epoxy curing agent comprising at least one polyether amine and having an amine equivalent weight of at least 45 grams per mole of amine equivalents, a second epoxy curing agent distinct from the first epoxy curing agent, and a metal nitrate catalyst; and a part (B) comprising an epoxy resin, a filler material, an epoxy-based reactive diluent, and wherein the amount of filler material is selected such as to provide the part (B) with a hysteresis area of at least 30 Pa×1/s, when measured at 23° C. according to the test method described in the experimental section.

In a particular aspect of the precursor composition according to the present disclosure, the amount of filler material is selected such as to provide said part (B) with a hysteresis area of at least 40 Pa×1/s, at least 60 Pa×1/s, at least 80 Pa×1/s, at least 100 Pa×1/s, at least 110 Pa×1/s or even at least 120 Pa×1/s, when measured at 23° C. according to the test method described in the experimental section.

The curable adhesive compositions according to the disclosure may find particular use in structural bonding applications, in particular for adhesively bonding small parts such as brackets, in various industries such as construction, automotive, aeronautics or aerospace. The curable adhesive precursor compositions according to the disclosure are a more versatile alternative to conventional epoxy based compositions that are typically used for adhesively bonding small parts such as brackets. In addition, because curable adhesive compositions according to the disclosure allow adhesively bonding small parts such as brackets without the need to use supporting fixtures in any situations, bonding operations using such compositions are believed to be more cost-effective and less complex. In the context of industrial production, such as in construction, automotive, aeronautics or aerospace industries, the curable adhesive compositions of the present disclosure allows obtaining increased production rate and faster bonding operations.

In the context of the present disclosure, the expression "hysteresis area" is meant to designate the area between the up time-dependent flow curve and the down time-dependent flow curve resulting from rheological plate to plate measurements, wherein the up time-dependent flow curve (first curve) is the result of applying increasing shear stress to the tested material and the down time-dependent flow curve (second curve) is the result of the tested material going back to the initial shear stress value. The hysteresis area is believed to appropriately reflect the thixotropic properties of the curable precursor composition. The larger the area, the more thixotropic is the tested material. The test method for determining the hysteresis area is described in the experimental section.

In the context of the present disclosure still, the term "room temperature" refers to a temperature of 23° C. (+2° C.), at ambient pressure condition of 101 kPa.

As used herein, the "gel point" is the point where the storage modulus of the mixture resulting from mixing components (A) and (B) intersects its loss modulus. The test method for determining the gel point of the curable precursor composition is described in the experimental section.

Epoxy curing agents suitable for use in the present disclosure are compounds which are capable of crosslinking (curing) the epoxy resin. Suitable curing agents according to the present invention may be primary or secondary amines. The epoxy curing agent system present in part (A) comprises two epoxy curing agents, a first epoxy curing agent and a second epoxy curing agent which is distinct (i.e. chemically different) from the first epoxy curing agent.

The first epoxy curing agent for use herein comprises at least one polyether amine and having an amine equivalent weight (AEW) of at least 45 grams per mole of amine equivalents. In that context, the first epoxy curing agent for use herein may be any aliphatic, cycloaliphatic, linear, branched or aromatic polyether amine provided it meets the (AEW) requirement mentioned above.

Without wishing to be bound by theory, it is believed that the first epoxy curing agent comprising at least one polyether amine and having an amine equivalent weight of at least 45 grams per mole of amine equivalents provides fast curing properties to the curable adhesive due its inherent high reactivity, while further providing excellent chemical resistance after curing with the epoxy resin.

In particular aspect, the first epoxy curing agent for use herein may have the general structure:

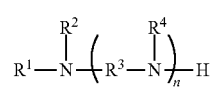

Formula (1)

wherein
the residues $R^1$, $R^2$, and $R^4$, independently from each other, may represent hydrogen or a hydrocarbon (such as an alkyl) or an alkoxy or a polyoxyalkyl residue containing about 1 to 15 carbon atoms;
$R^3$ represents a polyether alkyl residue, preferably containing about 1 to 15 carbon atoms;
n represents any integer from 1 to 10.

In a preferred aspect, the residues $R^1$, $R^2$, and $R^4$ are chosen such that the amine contains at least one or two primary amine groups.

In a particular aspect, the first epoxy curing agent is a polyether amine having one or two or more primary amine moieties. The polyether amine may have from 1 to 12, or even from 1 to 6 catenary ether (oxygen) atoms.

In a preferred aspect, the first epoxy curing agent comprises at least one polyether amine derived from polypropylene oxide or polyethylene oxide. Exemplary polyether amines suitable for use herein are commercially available under the trade designation JEFFAMINE from Huntsman Chemicals, or TTD (4,7,10-trioxatridecane-1,13-diamine) commercially available, for example, from BASF, Ludwigshafen Germany.

According to a particular aspect of the precursor composition of the present disclosure, the first epoxy curing agent for use herein comprises at least one polyether amine having an amine equivalent weight of at least 50 grams per mole of amine equivalents, or even at least 55 grams per mole of amine equivalents.

In a typical aspect, part (A) of the curable precursor composition of the present disclosure comprises from 20 to 85 wt %, from 40 to 80 wt %, from 50 to 75 wt %, or even from 60 to 75 wt % of a first epoxy curing agent comprising at least one polyether amine and having an amine equivalent weight of at least 45 grams per mole of amine equivalents, based on the weight of the part (A).

The precursor composition according to the disclosure comprises in its part (A) a second epoxy curing agent distinct from the first epoxy curing agent. The second epoxy curing agent for use herein is not particularly limited. Any epoxy curing agent commonly known in the art may be used in the context of the present disclosure provided it is chemically different from the first epoxy curing agent. In that context, the second epoxy curing agent for use herein may be any aliphatic, cycloaliphatic, linear, branched or aromatic amine.

Without wishing to be bound by theory, it is believed that the second epoxy curing agent provides acceleration effect to the curing reaction and beneficially impacts the ability to cure at room temperature.

In particular aspect, the second epoxy curing agent for use herein may have the general structure:

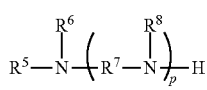

Formula (2)

wherein
the residues $R^5$, $R^6$, and $R^8$, independently from each other, may represent hydrogen or a hydrocarbon (such as an alkyl) or an alkoxy or a polyoxyalkyl residue containing about 1 to 15 carbon atoms;

$R^7$ represents a hydrocarbon, an alkylether or a polyether alkyl residue, preferably containing about 1 to 15 carbon atoms;

p represents any integer from 1 to 10.

In a particular aspect, the residues $R^1$, $R^2$, and $R^4$ are chosen such that the amine contains at least one or two primary amine groups.

According to another particular aspect of the present disclosure, the second epoxy curing agent for use herein is selected form the group consisting of imidazoles, imidazole-salts, imidazolines or aromatic tertiary amines including those having the structure of formula:

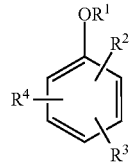

Formula (3)

wherein
$R^1$ is H or alkyl, such as, e.g., methyl or ethyl, preferably methyl;
$R^2$ is $CH_2$—$NR^5R^6$;
$R^3$ and $R^4$ may be, independently from each other, present or absent and when present $R^3$ and $R^4$ are $CH_2$—$NR^5R^6$;
$R^5$ and $R^6$ are, independent from each other, alkyl, preferably $CH_3$ or $CH_2CH_3$.

Exemplary second epoxy curing agents for use herein includes tris-2,4,6-(dimethylaminomethyl)phenol commercially available under the trade designation ANCAMINE K54 from Air Products and Chemicals Inc.

According to a particular aspect of the precursor composition of the present disclosure, the second epoxy curing agent for use herein has an amine equivalent weight of at least 50 grams per mole of amine equivalents, at least 100 grams per mole of amine equivalents, at least 150 grams per mole of amine equivalents, at least 200 grams per mole of amine equivalents, or even at least 250 grams per mole of amine equivalents.

In a typical aspect, part (A) of the curable precursor composition of the present disclosure comprises from 1 to 20 wt %, from 4 to 15 wt %, from 8 to 15 wt %, or even from 10 to 15 wt % of a second epoxy curing agent, based on the weight of the part (A).

The precursor composition according to the present disclosure comprises in its part (A) a metal nitrate catalyst. The metal nitrate catalyst for use herein is not particularly limited. Any metal nitrate catalyst commonly known in the art may be used in the context of the present disclosure.

Without wishing to be bound by theory, it is believed that the metal nitrate catalyst provides further acceleration effect to the curing reaction and forms a reactive complex with the second epoxy curing agent beneficially impacting the thixotropic properties of the curable adhesive composition.

According to a particular aspect of the present disclosure, the metal salt of the metal nitrate catalyst for use herein is selected from the group consisting of group I metal cations, group II metal cations, and lanthanoid salts.

In a particular aspect, the metal nitrate catalyst for use herein is selected from the group consisting of calcium nitrate, alumina nitrate, magnesium nitrate, lithium nitrate, lanthanum nitrate and any combinations or mixtures thereof. In a preferred aspect, the metal nitrate catalyst is selected from the group consisting of calcium nitrate, magnesium nitrate, and any combinations or mixtures thereof. Preferably, the metal nitrate catalyst for use herein is calcium nitrate.

In a typical aspect, part (A) of the curable precursor composition of the present disclosure comprises at least 5 wt %, at least 6 wt %, at least 8 wt %, at least 9 wt %, or even at least 10 wt % of a metal nitrate catalyst, based on the weight of the part (A).

In another typical aspect, part (A) of the curable precursor composition of the present disclosure comprises less than 15 wt %, less than 14 wt %, less than 13 wt %, or even less than 12 wt % of a metal nitrate catalyst, based on the weight of the part (A).

Typically still, part (A) of the curable precursor composition of the present disclosure comprises an amount of the metal nitrate catalyst comprised between 5 and 15 wt %, between 7 and 15 wt %, between 8 and 13 wt %, or even between 9 and 12 wt %, based on the weight of the part (A).

The precursor composition according to the present disclosure may optionally comprise in its part (A) a metal triflate catalyst. The metal triflate catalyst for use herein is not particularly limited. Any metal triflate catalyst commonly known in the art may be used in the context of the present disclosure.

Without wishing to be bound by theory, it is believed that the metal triflate catalyst provides a further boosting effect to the curing reaction.

According to a particular aspect of the present disclosure, the metal salt of the metal triflate catalyst for use herein is selected from the group consisting of group I metal cations, group II metal cations, and lanthanoid salts.

In a particular aspect, the metal triflate catalyst for use herein is selected from the group consisting of calcium triflate, magnesium triflate, lithium triflate, lanthanum triflate, and any combinations or mixtures thereof. In a preferred aspect, the metal triflate catalyst is selected from the group consisting of calcium triflate, magnesium triflate, and any combinations or mixtures thereof. Preferably, the metal triflate catalyst for use herein is calcium triflate.

In a typical aspect, part (A) of the curable precursor composition of the present disclosure may optionally comprise an amount of the metal triflate catalyst comprised between 2 and 12 wt %, between 2 and 10 wt %, between 3 and 9 wt %, or even between 4 and 8 wt %, based on the weight of the part (A).

The precursor composition according to the present disclosure comprises in its part (B) an epoxy resin. The epoxy resin for use herein is not particularly limited. Any epoxy resin commonly known in the art may be used in the context of the present disclosure.

Epoxy resins are polymers having one or more epoxy-functionality. Typically but not exclusively, the polymers contain repeating units derived from monomers having an epoxy-functionality but epoxy resins can also include, for example, silicone-based polymers that contain epoxy groups or organic polymer particles coated with or modified with epoxy groups or particles coated with, dispersed in, or modified with epoxy-groups-containing polymers. The epoxy-functionalities allow the resin to undertake cross-linking reactions. The epoxy resins may have an average epoxy-functionality of at least 1, greater than one, or of at least 2.

Any epoxy resins well known to those skilled in the art may be used in the context of the present disclosure. Epoxy resins may be aromatic, aliphatic, cycloaliphatic or mixtures thereof. In a typical aspect, the epoxy resins for use herein are aromatic. Preferably, the epoxy resins contain moieties of the glycidyl or polyglycidyl ether type. Such moieties may be obtained, for example, by the reaction of a hydroxyl functionality (for example but not limited to dihydric or polyhydric phenols or aliphatic alcohols including polyols) with an epichlorohydrin-functionality. As referred to herein, dihydric phenols are phenols containing at least two hydroxy groups bonded to the aromatic ring (also referred to as "aromatic" hydroxy groups) of a phenol—or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups.

Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethyl methylmethane, dihydroxydiphenylmethylpropylmethane, dihydroxydiphenylethylphenyl-methane, dihydroxydiphenylpropylenphenylmethane, dihydroxydiphenylbutylphenyl-methane, dihydroxydiphenyltolylethane, dihydroxydiphenyltolylmethylmethane, dihydroxydiphenyldicyclohexylmethane, and dihydroxydiphenylcyclohexane.

Preferred epoxy resins include epoxy resins containing or consisting of glycidyl ethers or polyglycidyl ethers of dihydric or polyhydric phenols, such as for example, but not limited to bisphenol A, bisphenol F and combinations thereof. They contain one or more repeating units derived from bisphenol A and/or F. Such ethers, or such repeating units are obtainable, for example, by a polymerization of glycidyl ethers of bisphenol A and/or F with epichlorohydrin. Epoxy resins of the type of diglycidyl ether of bisphenol A can be represented by formula (4) wherein n denotes the repeating unit (in case of n=0 formula (4) represents the diglycidyl ether of bisphenol A):

Formula (4)

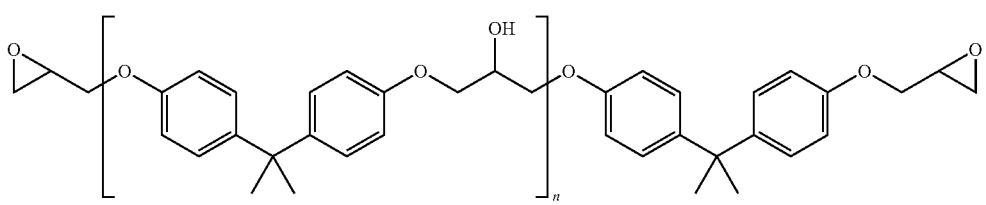

Typically, the epoxy resins are blends of several resins. Accordingly, n in formula (II) may represent an average value of the blend, and may not be an integer but may include values like, for example and not limited thereto, 0.1 to 2.5.

Instead of, or in addition to, using the aromatic epoxy resins described above also their fully or partially hydrogenated derivatives (i.e. the corresponding cycloaliphatic compounds) may be used. Instead of, or in addition to using aromatic epoxy resins also aliphatic, for example cyclic or acyclic, linear or branched, epoxy resins may be used.

In a particular aspect of the curable structural adhesive composition of the present disclosure, the epoxy resin comprises a combination or a mixture of two or three different epoxy resins. Preferably, the epoxy resin is liquid at room temperature but also solid epoxy resins, or resin particles may be used or may be used in dissolved form, for example dissolved or dispersed in a solvent or another liquid resin. In a typical aspect, the curable structural adhesive composition of the present disclosure comprises a mixture of liquid and solid epoxy resins, in particular a mixture of a liquid and a solid epoxy resin.

Preferably, the epoxy resin is liquid at ambient conditions (23° C., 1 bar). Typically, the epoxy resins may have a viscosity as measured according to ASTM D445 of from about 4 to about 10, preferably from about 4.5 to 6.0 mPa·s at 20° C.

The epoxy resins may contain halogens, preferably bromine atoms to make them less flammable.

Examples of suitable and commercially available epoxy resins include diglycidylether of bisphenol A (available under the trade designation EPON 828, EPON 830, EPON 1001 or EPIKOTE 828 from Hexion Specialty Chemicals GmbH, Rosbach, Germany, or under the trade designation D.E.R-331 or D.E.R-332 from Dow Chemical Co); diglycidyl ether of bisphenol F (e.g. EPICLON 830 available from Dainippon Ink and Chemicals, Inc. or D.E.R.-354 from Dow Chemical Co, Schwalbach/Ts., Germany); diglycidyl ethers of a blend of bisphenol A and bisphenol F (e.g. EPIKOTE 232 available from Momentive Speciality Chemicals, Columbus, USA).

Other epoxy resins based on bisphenols are commercially available under the trade designations EPILOX (Leuna Epilox GmbH, Leuna, Germany); flame retardant epoxy resins are available under the trade designation D.E.R 580 (a brominated bisphenol type epoxy resin available from Dow Chemical Co.).

In a typical aspect, part (B) of the curable precursor composition of the present disclosure comprises from 15 to 70 wt %, from 20 to 65 wt %, from 30 to 60 wt %, or even from 40 to 60 wt % of an epoxy resin, based on the weight of the part (B).

The precursor composition according to the present disclosure comprises in its part (B) a filler material. The filler material for use herein is not particularly limited. Any filler material commonly known in the art may be used in the context of the present disclosure.

Without wishing to be bound by theory, it is believed that the presence of a filler material beneficially impacts the rheological properties of the curable adhesive composition.

Suitable fillers for use herein include, but are not limited to, particulate fillers, in particular silica particles. Advantageously, the fillers for use herein include amorphous (non-hollow) silica particles, hollow silica particles (hollow glass microspheres), fumed silica, in particular hydrophobically fumed silica, fused silica, silica-gels, calcium silicates, and any combinations or mixtures thereof.

Exemplary commercial fillers include SHIELDEX AC5 (a synthetic amorphous silica, calcium hydroxide mixture available from W.R. Grace in Columbia, Md., USA); CAB-O-SIL TS 720 (a hydrophobic fumed silica-treated with polydimethyl-siloxane-polymer available from Cabot GmbH in Hanau, Germany); AEROSIL VP-R-2935 (a hydrophobically fumed silica available from Degussa in Disseldorf, Germany); AEROSIL R-202 (a hydrophobically fumed silica available from Evonik Industries, Germany); glass-beads class IV (250-300 microns); Micro-billes de verre 180/300 (available from CVP S.A. in France); MIN-SIL SF 20 (available from Minco Inc., 510 Midway, Tenn., USA); amorphous, fused silica; and APYRAL 24 ESF (epoxysilane-functionalized (2 wt %) aluminium trihydrate available from Nabaltec GmbH in Schwandorf, Germany). Fused silica is available, for example, under the trade designation MINSIL from Minco Inc., Midway, USA. Hollow glass microspheres are available under the trade designation 3M Glass Bubbles from 3M Company, St. Paul, Minn., USA.

In an advantageous aspect of the present disclosure, the filler material for use herein is selected from the group consisting of fumed silica, in particular hydrophobically fumed silica, fused silica, amorphous (non-hollow) silica particles, hollow silica particles, and any combinations or mixtures thereof.

According to preferred aspect, the filler material for use herein is selected from the group of fumed silica, in particular hydrophobically or hydrophilically fumed silica, preferably hydrophobically fumed silica.

According to another preferred aspect, part (B) of the curable precursor composition of the present disclosure comprises a filler material comprising fumed silica, in particular hydrophobically fumed silica, in combination with hollow glass microspheres.

In a typical aspect, part (B) of the curable precursor composition of the present disclosure comprises at least 5 wt %, at least 6 wt %, at least 8 wt %, at least 9 wt %, or even at least 10 wt % of a filler material, based on the weight of the part (B).

In another typical aspect, part (B) of the curable precursor composition of the present disclosure comprises less than 15 wt %, less than 14 wt %, less than 13 wt %, or even less than 12 wt % of a filler material, based on the weight of the part (B).

Typically still, part (B) of the curable precursor composition of the present disclosure comprises an amount of filler material comprised between 5 and 15 wt %, between 7 and 15 wt %, between 8 and 13 wt %, or even between 9 and 12 wt %, based on the weight of the part (B).

The precursor composition according to the present disclosure comprises in its part (B) an epoxy-based reactive diluent. Reactive diluents are epoxy-containing molecules. The epoxy-based reactive diluent for use herein is not particularly limited. Any epoxy-based reactive diluent commonly known in the art may be used in the context of the present disclosure.

Without wishing to be bound by theory, it is believed that the epoxy-based reactive diluent beneficially impacts, in particular, the extrudability characteristics of the curable adhesive composition.

In a particular aspect of the present disclosure, the epoxy-based reactive diluent for use herein has a saturated or unsaturated cyclic backbone, and preferably comprises glycidyl ether as reactive terminal end portions.

According to a preferred aspect, the epoxy-based reactive diluent for use herein is selected from the group consisting of diglycidyl ether of resorcinol, diglycidyl ether of cyclohexane dimethanol, diglycidyl ether of neopentyl glycol, triglycidyl ether of trimethylolpropane, and any mixtures thereof.

Commercially available reactive diluents for use herein include for example "Reactive Diluent 107" (available from Hexion) and the "Epodil" series (available from Air Products and Chemical Inc, Allentown, Pa., USA) including in particular EPODIL 746, EPODIL 747, EPODIL 748 and EPODIL 757.

In a typical aspect, part (B) of the curable precursor composition of the present disclosure comprises at least 10 wt %, at least 12 wt %, at least 15 wt %, at least 17 wt %, or even at least 20 wt % of an epoxy-based reactive diluent, based on the weight of the part (B).

In another typical aspect, part (B) of the curable precursor composition of the present disclosure comprises less than 40 wt %, less than 35 wt %, less than 30 wt %, or even less than 25 wt % of an epoxy-based reactive diluent, based on the weight of the part (B).

Typically still, part (B) of the curable precursor composition of the present disclosure comprises an amount of an epoxy-based reactive diluent comprised between 10 and 40 wt %, between 15 and 35 wt %, between 15 and 30 wt %, or even between 15 and 25 wt %, based on the weight of the part (B).

According to an advantageous aspect of the curable precursor composition of the present disclosure, the epoxy-based reactive diluent and the filler material are present in the part (B) in a weight ratio comprised between [1.2:1] and [3.0:1], between [1.5:1] and [2.8:1], between [1.5:1] and [2.5:1], or even between [1.8:1] and [2.3:1].

The precursor composition according to the present disclosure may optionally comprise in its part (B) a core-shell polymer toughening agent. The core-shell polymer toughening agent for use herein is not particularly limited. Any core-shell polymer toughening agent commonly known in the art may be used in the context of the present disclosure.

Without wishing to be bound by theory, it is believed that the core-shell polymer toughening agent beneficially impacts, in particular, the low stringing characteristics of the curable adhesive composition.

According to a particular aspect of the present disclosure, the core-shell polymer toughening agent for use herein is selected from the group of styrene-butadiene particles.

In a typical aspect, part (B) of the curable precursor composition of the present disclosure may optionally comprise an amount of core-shell polymer toughening agent comprised between 1 and 10 wt %, between 2 and 8 wt %, between 3 and 8 wt %, or even between 4 and 6 wt %, based on the weight of the part (B).

In a particular aspect, the precursor composition according to the present disclosure comprises:
a) a part (A) comprising:
  i. from 20 to 85 wt %, from 40 to 80 wt %, from 50 to 75 wt %, or even from 60 to 75 wt % of a first epoxy curing agent comprising at least one polyether amine and having an amine equivalent weight of at least 45 grams per mole of amine equivalents, based on the weight of the part (A);
  ii. from 1 to 20 wt %, from 4 to 15 wt %, from 8 to 15 wt %, or even from 10 to 15 wt % of a second epoxy curing agent distinct from the first epoxy curing agent, based on the weight of the part (A);
  iii. from 5 to 15 wt %, from 7 to 15 wt %, from 8 to 13 wt %, or even from 9 to 12 wt % of a metal nitrate catalyst, based on the weight of the part (A);
  iv. optionally, from 2 to 12 wt %, from 2 to 10 wt %, from 3 to 9 wt %, or even from 4 to 8 wt % of a metal triflate catalyst, based on the weight of the part (A); and
b) a part (B) comprising:
  i. from 15 to 70 wt %, from 20 to 65 wt %, from 30 to 60 wt %, or even from 40 to 60 wt % of an epoxy resin, based on the weight of the part (B);
  ii. from 5 to 15 wt %, from 7 to 15 wt %, from 8 to 13 wt %, or even from 9 to 12 wt % of a filler material, based on the weight of the part (B);
  iii. from 10 to 40 wt %, from 15 to 35 wt %, from 15 and 30 wt %, or even from 15 to 25 wt % of an epoxy-based reactive diluent, based on the weight of the part (B); and
  iv. optionally, from 1 to 10 wt %, from 2 to 8 wt %, from 3 and 8 wt %, or even from 4 to 6 wt % of a core-shell polymer toughening agent, based on the weight of the part (B).

Advantageously, the curable adhesive precursor composition of the present disclosure provides fast curing performance, including at room temperature. The curing speed performance at room temperature directly translates into the following advantages: increased production rate; faster, less complex and more cost effective adhesive bonding operations as no additional heating step is required.

According to an advantageous aspect, the precursor composition for a curable adhesive of the present disclosure is able to reach the gel point in less than 140 minutes, less than 130 minutes, less than 120 minutes, less than 115 minutes or even less than 110 minutes, when measured by DMA at 23° C. according to the test method described in the experimental section.

Advantageously still, the precursor composition for a curable adhesive of the present disclosure provides rapid curing at room temperature whilst preserving advantageous characteristics with respect to work life. In the context of the present disclosure, the expression "work life" is meant to refer to the time during which the curable adhesive precursor composition can still be processed and used in bonding operations after mixing.

In a typical aspect, the curable precursor composition has a work life of at least 5 minutes, at least 8 minutes, at least 10 minutes, at least 12 minutes, or even at least 15 minutes, when measured at 23° C. according to the test method described in the experimental section.

Advantageously still, the precursor composition for a curable adhesive of the present disclosure provides excellent thixotropic characteristics whilst preserving advantageous performance with respect to extrudability by hand.

In an advantageous aspect, the curable precursor composition of the present disclosure provides an extrusion rate of at least 1.8 g/min, at least 2 g/min, at least 2.2 g/min, at least 2.4, at least 2.6 g/min, at least 2.8 g/min or even at least 2.9 g/min, when being extruded at a temperature of 23° C. according to the test method described in the experimental section.

As such, the curable adhesive precursor composition described herein is particularly suitable for manufacturing operations in construction, automotive, aeronautics or aerospace industries, in particular for manually-operated bonding operations of small parts such as brackets.

The curable adhesive precursor composition of the present disclosure additionally provides excellent mechanical and adhesive properties, including excellent peel strength and shear resistance.

According to an advantageous aspect, the precursor composition for a curable adhesive of the present disclosure which provides an overlap shear strength of 10 MPa in less than 120 minutes, less than 110 minutes, less than 100 minutes, less than 90 minutes, or even less than 80 minutes, when measured at 23° C. according to the test method described in the experimental section.

In still another advantageous aspect, the curable precursor composition has a peel strength of at least 100 N/25 mm, at least 110 N/25 mm, or even at least 120 N/25 mm, when measured at 23° C. according to the test method described in the experimental section.

In another aspect, the present disclosure relates to a method of bonding an article to a substrate, wherein the method comprises the step of:
a) providing a precursor composition for a curable adhesive as described above;
b) combining part (A) and part (B) so as to form a curable adhesive composition;
c) applying the curable adhesive composition to at least part of the surface of the article and/or to the substrate;
d) adhesively contacting the article to the substrate via the curable adhesive composition; and
e) allowing the curable adhesive composition to cure.

The method of the present disclosure is particularly suitable for bonding small parts that are typically used in manufacturing and repairing operations in construction, automotive, aeronautics or aerospace industries. Exemplary articles typically used in such operations include, but are not limited to, brackets, studs, pins, cable holders, fasteners, hooks, cable ducts, hinges, and any combinations thereof.

In an advantageous aspect of the method of bonding an article to a substrate as described herein, the article is selected from the group consisting of brackets, cable holders, hooks, cable ducts, and any combinations thereof. Advantageously, the article for use herein is a bracket.

Various types of brackets may be used in the context of practising the method according to the disclosure. In an advantageous execution, the bracket for use herein comprises a material selected from the group consisting of thermoplastic polymers, metals, composites, and any combinations or mixtures thereof. According to a more preferred execution, the bracket for use herein comprises a thermoplastic material, in particular acrylonitrile butadiene styrene, polyetherimide, polyamide, and any combinations or mixtures thereof.

Various substrate types typically found in manufacturing and repairing operations in construction, automotive, aeronautics or aerospace industries, may be used in the context of practising the method according to the disclosure. In an advantageous aspect, the surface for use herein comprises a material selected from the group consisting of thermoplastic polymers, metals, composites, and any combinations or mixtures thereof.

Due in particular to their excellent thixotropic characteristics, the curable adhesive precursor compositions of the present disclosure are outstandingly suitable for use in structural bonding applications, in particular for adhesively bonding small parts such as brackets, whereby the small parts such as brackets are adhesively bonded to surfaces which are inclined, vertical or overhead.

Accordingly, and in a particular aspect of the method of bonding an article to a substrate as described herein, the surface is an inclined, vertical or overhead surface. Preferably, the surface is a vertical or overhead surface.

In a typical aspect of the present disclosure, the method of bonding an article to a substrate does not comprise the step of using a supporting fixture for maintaining the bracket during the step of adhesively contacting the article to the substrate via the curable adhesive composition.

According to another aspect, the present disclosure relates to the use of a precursor composition as described above for industrial applications, in particular for manufacturing and repairing operations in construction, automotive, aeronautics or aerospace industries.

According to still another aspect, the present disclosure relates to the use of a curable precursor composition as described above for bonding a bracket to a substrate, in particular a bracket for use in manufacturing and repairing operations in construction, automotive, aeronautics or aerospace industries.

Item 1 is a precursor composition for a curable adhesive, said precursor comprising:
a) a part (A) comprising:
   i. a first epoxy curing agent comprising at least one polyether amine and having an amine equivalent weight of at least 45 grams per mole of amine equivalents;
   ii. a second epoxy curing agent distinct from the first epoxy curing agent;
   iii. a metal nitrate catalyst;
   iv. optionally, a metal triflate catalyst; and
b) a part (B) comprising:
   i. an epoxy resin;
   ii. a filler material;
   iii. an epoxy-based reactive diluent; and
   iv. optionally, a core-shell polymer toughening agent;
and wherein the amount of filler material is selected such as to provide the part (B) with a hysteresis area of at least 30 Pa×1/s, when measured at 23° C. according to the test method described in the experimental section.

Item 2 is a precursor composition according to item 1, wherein the amount of filler material is selected such as to provide said part (B) with a hysteresis area of at least 40 Pa×1/s, at least 60 Pa×1/s, at least 80 Pa×1/s, at least 100 Pa×1/s, at least 110 Pa×1/s or even at least 120 Pa×1/s, when measured at 23° C. according to the test method described in the experimental section.

Item 3 is a precursor composition according to any of item 1 or 2, wherein the amount of the filler material is at least 5 wt %, at least 6 wt %, at least 8 wt %, at least 9 wt %, or even at least 10 wt %, based on the weight of the part (B).

Item 4 is a precursor composition according to any of the preceding items, wherein the amount of the filler material is less than 15 wt %, less than 14 wt %, less than 13 wt %, or even less than 12 wt %, based on the weight of the part (B).

Item 5 is a precursor composition according to any of the preceding items, wherein the amount of the filler material is comprised between 5 and 15 wt %, between 7 and 15 wt %, between 8 and 13 wt %, or even between 9 and 12 wt %, based on the weight of the part (B).

Item 6 is a precursor composition according to any of the preceding items, wherein the filler material is selected from the group of particulate fillers, in particular silica particles.

Item 7 is a precursor composition according to any of the preceding items, wherein the filler material is selected from the group consisting of fumed silica, in particular hydrophobically fumed silica, fused silica, amorphous (non-hollow) silica particles, hollow silica particles, silica-gels, calcium silicates, hollow glass microspheres, and any combinations or mixtures thereof.

Item 8 is a precursor composition according to item 7, wherein the filler material is selected from the group of fumed silica, in particular hydrophobically fumed silica.

Item 9 is a precursor composition according to any of the preceding items, wherein the amount of epoxy-based reactive diluent is at least 10 wt %, at least 12 wt %, at least 15 wt %, at least 17 wt %, or even at least 20 wt %, based on the weight of the part (B).

Item 10 is a precursor composition according to any of the preceding items, wherein the amount of epoxy-based reactive diluent is less than 40 wt %, less than 35 wt %, less than 30 wt %, or even less than 25 wt %, based on the weight of the part (B).

Item 11 is a precursor composition according to any of the preceding items, wherein the amount of epoxy-based reactive diluent is comprised between 10 and 40 wt %, between 15 and 35 wt %, between 15 and 30 wt %, or even between 15 and 25 wt %, based on the weight of the part (B).

Item 12 is a precursor composition according to any of the preceding items, wherein the epoxy-based reactive diluent and the filler material are present in the part (B) in a weight ratio comprised between [1.2:1] and [3.0:1], between [1.5:1] and [2.8:1], between [1.5:1] and [2.5:1], or even between [1.8:1] and [2.3:1].

Item 13 is a precursor composition according to any of the preceding items, wherein the epoxy-based reactive diluent has a saturated or unsaturated cyclic backbone, and preferably comprising glycidyl ether as reactive terminal end portions.

Item 14 is a precursor composition according to item 13, wherein the epoxy-based reactive diluent is selected from the group consisting of diglycidyl ether of resorcinol, diglycidyl ether of cyclohexane dimethanol, diglycidyl ether of neopentyl glycol, triglycidyl ether of trimethylolpropane, and any mixtures thereof.

Item 15 is a precursor composition according to any of the preceding items, wherein the first epoxy curing agent comprising at least one polyether amine has an amine equivalent weight of at least 50 grams per mole of amine equivalents, or even at least 55 grams per mole of amine equivalents.

Item 16 is a precursor composition according to any of the preceding items, wherein the first epoxy curing agent comprises at least one polyether amine derived from polypropylene oxide or polyethylene oxide.

Item 17 is a precursor composition according to any of the preceding items, wherein the second epoxy curing agent is selected from the group of aliphatic, aromatic, linear or branched, primary, secondary or tertiary amines, in particular from the group of aromatic tertiary amines.

Item 18 is a precursor composition according to any of the preceding items, wherein the second epoxy curing agent has an amine equivalent weight of at least 50 grams per mole of amine equivalents, at least 100 grams per mole of amine equivalents, at least 150 grams per mole of amine equivalents, at least 200 grams per mole of amine equivalents, or even at least 250 grams per mole of amine equivalents.

Item 19 is a precursor composition according to any of the preceding items, wherein the amount of the metal nitrate catalyst is at least 5 wt %, at least 6 wt %, at least 8 wt %, at least 9 wt %, or even at least 10 wt %, based on the weight of the part (A).

Item 20 is a precursor composition according to any of the preceding items, wherein the amount of the metal nitrate catalyst is less than 15 wt %, less than 14 wt %, less than 13 wt %, or even less than 12 wt %, based on the weight of the part (A).

Item 21 is a precursor composition according to any of the preceding items, wherein the amount of the metal nitrate catalyst is comprised between 5 and 15 wt %, between 7 and 15 wt %, between 8 and 13 wt %, or even between 9 and 12 wt %, based on the weight of the part (A).

Item 22 is a precursor composition according to any of the preceding items, wherein the metal salt of the metal nitrate catalyst is selected from the group consisting of group I metal cations, group II metal cations, and lanthanoid salts.

Item 23 is a precursor composition according to any of the preceding items, wherein metal nitrate catalyst is selected from the group consisting of calcium nitrate, alumina nitrate, magnesium nitrate, lithium nitrate, lanthanum nitrate and any combinations or mixtures thereof.

Item 24 is a precursor composition according to any of the preceding items, wherein the metal nitrate catalyst is selected from the group consisting of calcium nitrate, magnesium nitrate, and any combinations or mixtures thereof.

Item 25 is a precursor composition according to any of the preceding items, which comprises a metal triflate catalyst preferably in an amount comprised between 2 and 12 wt %, between 2 and 10 wt %, between 3 and 9 wt %, or even between 4 and 8 wt %, based on the weight of the part (A).

Item 26 is a precursor composition according to any of the preceding items, wherein the metal triflate catalyst is selected from the group consisting of calcium triflate, magnesium triflate, lithium triflate, lanthanum triflate and any combinations or mixtures thereof.

Item 27 is a precursor composition according to any of the preceding items, wherein metal triflate catalyst is selected from the group consisting of calcium triflate, magnesium triflate, and any combinations or mixtures thereof.

Item 28 is a precursor composition according to any of the preceding items, which comprises a core-shell polymer toughening agent preferably in an amount comprised between 1 and 10 wt %, between 2 and 8 wt %, between 3 and 8 wt %, or even between 4 and 6 wt %, based on the weight of the part (B).

Item 29 is a precursor composition according to any of the preceding items, which comprises a core-shell polymer toughening agent selected from styrene-butadiene particles.

Item 30 is a precursor composition according to any of the preceding items, which comprises:
a) a part (A) comprising:
  i. from 20 to 85 wt %, from 40 to 80 wt %, from 50 to 75 wt %, or even from 60 to 75 wt % of a first epoxy curing agent comprising at least one polyether amine and having an amine equivalent weight of at least 45 grams per mole of amine equivalents, based on the weight of the part (A);
  ii. from 1 to 20 wt %, from 4 to 15 wt %, from 8 to 15 wt %, or even from 10 to 15 wt % of a second epoxy curing agent distinct from the first epoxy curing agent, based on the weight of the part (A);
  iii. from 5 to 15 wt %, from 7 to 15 wt %, from 8 to 13 wt %, or even from 9 to 12 wt % of a metal nitrate catalyst, based on the weight of the part (A);
  iv. optionally, from 2 to 12 wt %, from 2 to 10 wt %, from 3 to 9 wt %, or even from 4 to 8 wt % of a metal triflate catalyst, based on the weight of the part (A); and
b) a part (B) comprising:
  i. from 15 to 70 wt %, from 20 to 65 wt %, from 30 to 60 wt %, or even from 40 to 60 wt % of an epoxy resin, based on the weight of the part (B);
  ii. from 5 to 15 wt %, from 7 to 15 wt %, from 8 to 13 wt %, or even from 9 to 12 wt % of a filler material, based on the weight of the part (B);
  iii. from 10 to 40 wt %, from 15 to 35 wt %, from 15 and 30 wt %, or even from 15 to 25 wt % of an epoxy-based reactive diluent, based on the weight of the part (B); and
  iv. optionally, from 1 to 10 wt %, from 2 to 8 wt %, from 3 and 8 wt %, or even from 4 to 6 wt % of a core-shell polymer toughening agent, based on the weight of the part (B).

Item 31 is a precursor composition according to any of the preceding items, which reaches the gel point in less than 140 minutes, less than 130 minutes, less than 120 minutes, less than 115 minutes or even less than 110 minutes, when measured by DMA at 23° C. according to the test method described in the experimental section.

Item 32 is a precursor composition according to any of the preceding items, which provides an overlap shear strength of 10 MPa in less than 120 minutes, less than 110 minutes, less than 100 minutes, less than 90 minutes, or even less than 80 minutes, when measured at 23° C. according to the test method described in the experimental section.

Item 33 is a precursor composition according to any of the preceding items, which provides an extrusion rate of at least 1.8 g/min, at least 2 g/min, at least 2.2 g/min, at least 2.4, at least 2.6 g/min, at least 2.8 g/min or even at least 2.9 g/min, when being extruded at a temperature of 23° C. according to the test method described in the experimental section.

Item 34 is a precursor composition according to any of the preceding items, which has a peel strength of at least 100 N/25 mm, at least 110 N/25 mm, or even at least 120 N/25 mm, when measured at 23° C. according to the test method described in the experimental section.

Item 35 is a method of bonding an article to a substrate, wherein the method comprises the step of:
 a) providing a precursor composition for a curable adhesive as described above;
 b) combining part (A) and part (B) so as to form a curable adhesive composition;
 c) applying the curable adhesive composition to at least part of the surface of the article and/or to the substrate;
 d) adhesively contacting the article to the substrate via the curable adhesive composition; and
 e) allowing the curable adhesive composition to cure.

Item 36 is a method according to item 35, wherein the article is selected from those for use in manufacturing and repairing operations in construction, automotive, aeronautics or aerospace industries.

Item 37 is a method according to any if item 35 or 36, wherein the article is selected from the group consisting of brackets, studs, pins, cable holders, fasteners, hooks, cable ducts, hinges, and any combinations thereof.

Item 38 is a method according to any of items 35 to 37, wherein the article is a bracket, in particular for use in manufacturing and repairing operations in construction, automotive, aeronautics or aerospace industries.

Item 39 is a method according to any of item 37 or 38, wherein the article and/or the surface comprises a material selected from the group consisting of thermoplastic polymers, metals, composites, and any combinations or mixtures thereof.

Item 40 is a method according to any of items 37 to 39, wherein the article and/or the surface comprises a thermoplastic material, in particular acrylonitrile butadiene styrene, polyetherimide, polyamide, and any combinations or mixtures thereof.

Item 41 is a method according to any of items 35 to 40, wherein the surface is a vertical surface.

Item 42 is a method according to any of items 35 to 41, which does not comprise the step of using a supporting fixture for maintaining the bracket during the step of adhesively contacting the article to the substrate via the curable adhesive composition.

Item 43 is the use of a precursor composition according to any of items 1 to 34 for industrial applications, in particular for manufacturing and repairing operations in construction, automotive, aeronautics or aerospace industries.

Item 44 is the use of a precursor composition according to any of items 1 to 34 for bonding an article to a substrate, in particular a bracket for use in manufacturing and repairing operations in construction, automotive, aeronautics or aerospace industries.

EXAMPLES

The invention is further illustrated by the following examples. These examples are merely for illustrative purposes only and are not meant to be limiting on the scope of the appended claims.
Test Methods Applied:
Gel Point (by DMA)
 The gel point of the precursor composition for a curable adhesive according to the present disclosure is determined by dynamic mechanical analysis method using the following parameters. The gel point is the crossing point of elasticity and viscosity modulus. The gel point is recorded in minutes.

| Measurement Type | Time Sweep |
|---|---|
| Measurement Mode | Dynamic |
| Geometry | Parallel Plate |
| Geometry diameter | 8 mm |
| Gap | 1 mm |
| Frequency/Rate | ≈1 Hz |
| Strain | 10% |
| Temperature | 25° C. |
| Autotension | 0 ± 0.1N |
| Autostrain | x |

Overlap Shear Strength (OLS)
 OLS is determined according to DIN EN ISO 2243-1 (Aerospace series-non-metallic materials—structural adhesives—test method—part 1: Single lap shear) on 2024-T3 etched CLAD BR 127 primered alumina substrates. The bonding area between those substrates is 125×25 mm with a bondline thickness of 90-125 m. After curing 7 days at room temperature (23° C.) and 50% humidity, the substrate is tested under tensile load with a speed of 2.5-10 mm/min. The OLS values are recorded in MPa.
Extrusion Rate
 A 200 ml Cartridge for 2K compositions (Sulzer Mixpac AG, Haag, Switzerland) is filled manually to 200 ml with parts B and parts A in a ratio of 2:1 by volume. A mixing nozzle of type MCH 10-24 T (static 2K mixer from Sulzer Mixpac AG, Haag, Switzerland) is fitted to the cartridge. The mixing nozzle has a circular outlet nozzle having a diameter of 4.0 mm. The product is extruded from the cartridge by using a pneumatic dispensing gun. The extrusion rate is determined by measuring the quantity extruded applying a pressure 5 bar for 10 seconds. Measurements are made at room temperature. Each composition is tested 3 times and the results are expressed in g/min and represent the average from the three measurements.
Peel Strength
 Peel strength is determined according to DIN EN ISO 2243-2 (Aerospace series-non metallic materials-structural adhesives-test method-part 2: peel metal-metal) on CLAD BR 127 primered alumina substrates. The bonding area is 150×25 mm with a bondline thickness of 90-125 m. After curing 7 days at room temperature (23° C.) and 50% humidity, the substrate is tested under tensile load with a speed of 50 until 150 mm/min.
Extrudability
 Extrudability is determined by conducting extrudability testing at 23° C. through a MBH 05-16 T mixing nozzle (available from Sulzer Mixpac) out of a 50 ml cartridge. The extrudability property of the curable precursor composition (expressed in min) corresponds to the time until which a curable precursor composition—which has been extruded a first time through the mixing nozzle—can be extruded a second time through the same mixing nozzle.

Work Life

Work life of the curable adhesive is determined by extruding 3 grams of the curable adhesive at 23° C. through a MBH 05-16 T mixing nozzle (with a dispensing gun) out of a 50 ml cartridge. The work life of the curable adhesive (in min) corresponds to the time until which the curable adhesive starts showing stringing during application of it on a substrate.

Hysteresis Area

Hysteresis area of the curable precursor composition is determined by conducting rheological measurements using a Haake RheoStress 6000 rheometer (commercially available from Thermo Fischer Scientific Inc.) with a plate to plate measuring equipment having a plate diameter of 20 mm and equipped with a temperature control device with a temperature set at 23° C. After the sample has been applied to fill a 1 mm gap, it is left for 5 minutes without applying any force for the sample to relaxate. Then, an increasing rotating shear rate is applied beginning from 0 $s^{-1}$ to 1.5 $s^{-1}$, resting on 1.5 $s^{-1}$ for at least 1 minute and then decreasing again in the same manner to 0 $m^{-1}$. The two corresponding time-dependent flow curves are produced and the area between those two curves is defined as the hysteresis area and expressed in Pa/s.

Materials Employed:

EPIKOTE 828: epoxy resin consisting of a blend of bisphenol A and bisphenol F resin (Resolution advanced materials).

EPON 828: epoxy resin (Hexion Specialty Chemicals GmbH, Rosbach, Germany).

KANE ACE MX-257 (Kaneka, Belgium): butadiene based core/shell polymer (37% wt) dispersed in epoxy resin (diglycidylether of bisphenol A).

EPODIL 757: 1,4-cyclohexane dimethanol diglycidyl ether (Air Products and Chemicals Inc., Allentown, Pa./ USA).

GLYEO: additive—Glycidyltriethoxysilane (Sigma Aldrich).

BYK R606: additive—Polyhydroxycarbonic acid ester (BYK chemie, ALTANA group) AEROSIL R202: hydrophobic fumed silica (Evonik Industries, Frankfurt, Germany).

TTD: trioxatridecane diamine (BASF).

ANCAMINE K54: Tris-2,4,6-dimethyl amino methylphenol (Air Products and Chemicals, Inc., Allentown/PA/ USA).

CALCIUM NITRATE: $Ca(NO_3)_2 \cdot 4H_2O$, available from Sigma Aldrich.

CALCIUM TRIFLATE: available from Sigma Aldrich.

Preparation of Two Part Epoxy Compositions:

Preparation of Part A

Part A of the precursor composition for a curable adhesive is prepared by combining the ingredients as listed in Table 1 using a high speed mixer (DAC 150 FVZ Speedmixer, from Hauschild Engineering) with stirring at 3000 rpm. In a first step, the liquid components for part A are mixed together for 1 min. When used, calcium triflate is added by pestling the powder first and then dispersing it with the help of a dispenser disk with very high speed for one hour into the other ingredients listed in Table 1. The complete mixture is again stirred for at least 2 min at 3000 rpm in the high speed mixer to ensure complete dispersion of all ingredients. After all raw materials are added, the mixture is (optionally) degassed and the homogeneous paste is filled into the first unit of a dual pack cartridge (Sulzer Mixpac AG, Haag, Switzerland).

TABLE 1

Composition of part A (% by weight).

| Ingredient | A1 | A2 | A3 | A4 |
|---|---|---|---|---|
| TTD/EPON 828 adduct* | 70.3 | 76.9 | 72.2 | 75.3 |
| Calcium nitrate tetrahydrate | 11.0 | 10.8 | 10.2 | 10.6 |
| ALCAMINE K54 | 12.6 | 12.3 | 11.6 | 12.1 |
| Calcium triflate | 6.1 | — | 6.0 | 2.0 |

*TTD/EPON 828 adduct = trioxatridecane diamine adducted with EPON 828 in ratio of 58 g TTD and 18 g EPON 828 with an amine equivalent weight of 79 g/mol.

Preparation of Part B

Part B of the precursor composition for a curable adhesive is prepared by combining the ingredients as listed in Table 2 using a high speed mixer (DAC 150 FVZ Speedmixer, from Hauschild Engineering) with stirring at 3000 rpm. In a first step, the liquid components for part B are mixed together for 1 min. Aerosil is added in two steps with mixing for 1 min at 3000 rpm. After all raw materials are added, the mixture is (optionally) degassed and the homogeneous paste is filled into the second unit of a dual pack cartridge (Sulzer Mixpac AG, Haag, Switzerland).

TABLE 2

Composition of part B (% by weight).

| Ingredient | B1 | B2 | B3 | B4 |
|---|---|---|---|---|
| Epikote 828 | 60.3 | 48 | 52 | 55.6 |
| MX 257 | 14.2 | 14.1 | 14.1 | 14.1 |
| Epodil 757 | 14.4 | 22.3 | 22.3 | 22.3 |
| Aerosil R202 | 9.6 | 13.6 | 9.6 | 6.0 |
| Additive | 1.5 | 2 | 2.0 | 2 |
| Hysteresis area | ND* | >120 Pa/s | 70 Pa/s | 44 Pa/s |

*Not determined.

Mixing of Part a and Part B and Extrusion:

The dual pack Cartridge is filled manually to 50 ml with parts B and parts A in a ratio of 2:1 by volume. A mixing nozzle of type MBH 05-16 T (Sulzer Mixpac AG, Haag, Switzerland) is fitted to the cartridge. After a dwell time of 12-24 hours, the adhesive is extruded from the cartridge by using a manual dispensing gun. Curing is done at room temperature (23° C.).

EXAMPLES

Examples 1 to 4

In examples 1 to 4, curable precursor compositions were prepared from parts A1/B1, A2/B2, A3/B3 and A4/B4 in a 200 ml dual pack cartridge. Extrusion, curing and examination of the samples are done according to the general procedures given above. Test results are shown in Table 3.

TABLE 3

Properties of the cured epoxy resins.

| Test | Ex 1 (A1/B1) | Ex 2 (A2/B2) | Ex 3 (A3/B3) | Ex 4 (A4/B4) |
|---|---|---|---|---|
| Extrusion rate from dual Pac Cartridge [g/min] | ND* | 1.2 | 2.9 | >2.9 |

TABLE 3-continued

Properties of the cured epoxy resins.

| Test | Ex 1 (A1/B1) | Ex 2 (A2/B2) | Ex 3 (A3/B3) | Ex 4 (A4/B4) |
|---|---|---|---|---|
| OLS [MPa] 23° C. | 33.5 | 29 | 31.7 | 30.3 |
| OLS [MPa] 85° C. | 10.0 | 10 | 8.0 | 10.4 |
| OLS [MPa] 135° C. | 4.45 | 3.3 | 3.33 | 4.0 |
| Work life [min] | 8-12 | 30 | 8 | 12 |
| Extrudability (50 ml cartridge) [min] | 20-30 | 40-45 | 20 | 30 |
| Peel strength [N/25 mm] | 117 | 226 | 200 | 200 |
| Gel point [min] | 108-150 | >150 | 108 | 150 |

*Not determined.

The invention claimed is:

1. A precursor composition for a curable adhesive, said precursor comprising:
   a) a part (A) comprising:
      i. a first epoxy curing agent comprising at least one polyether amine and having an amine equivalent weight of at least 45 grams per mole of amine equivalents;
      ii. a second epoxy curing agent distinct from the first epoxy curing agent;
      iii. a metal nitrate catalyst;
      iv. optionally, a metal triflate catalyst; and
   b) a part (B) comprising:
      i. an epoxy resin;
      ii. a filler material;
      iii. an epoxy-based reactive diluent; and
      iv. optionally, a core-shell polymer toughening agent;
   and wherein the amount of filler material is selected such as to provide said part (B) with a hysteresis area of at least 30 Pa×1/s, when measured at 23° C. according to the test method described in the experimental section, and wherein the epoxy-based reactive diluent and the filler material are present in the part (B) in a weight ratio comprised between [1.2:1] and [3.0:1], between [1.5:1] and [2.8:1], between [1.5:1] and [2.5:1], or even between [1.8:1] and [2.3:1].

2. A precursor composition according to claim 1, wherein the amount of filler material is selected such as to provide said part (B) with a hysteresis area of at least 40 Pa×1/s, at least 60 Pa×1/s, at least 80 Pa×1/s, at least 100 Pa×1/s, at least 110 Pa×1/s or even at least 120 Pa×1/s, when measured at 23° C. according to the test method described in the experimental section.

3. A precursor composition according to claim 1, wherein the first epoxy curing agent comprising at least one polyether amine has an amine equivalent weight of at least 50 grams per mole of amine equivalents, or even at least 55 grams per mole of amine equivalents.

4. A precursor composition according to claim 1, wherein the first epoxy curing agent comprises at least one polyether amine derived from polypropylene oxide or polyethylene oxide.

5. A precursor composition according to claim 1, wherein the second epoxy curing agent has an amine equivalent weight of at least 50 grams per mole of amine equivalents, at least 100 grams per mole of amine equivalents, at least 150 grams per mole of amine equivalents, at least 200 grams per mole of amine equivalents, or even at least 250 grams per mole of amine equivalents.

6. A precursor composition according to claim 1, wherein the metal salt of the metal nitrate catalyst is selected from the group consisting of group I metal cations, group II metal cations, and lanthanoid salts.

7. A precursor composition according to claim 1, wherein the metal triflate catalyst is selected from the group consisting of calcium triflate, magnesium triflate, lithium triflate, lanthanum triflate and any combinations or mixtures thereof.

8. A method of bonding an article to a substrate, wherein the method comprises the step of:
   a) providing a precursor composition for a curable adhesive according to claim 1;
   b) combining part (A) and part (B) so as to form a curable adhesive composition;
   c) applying the curable adhesive composition to at least part of the surface of the article and/or to the substrate;
   d) adhesively contacting the article to the substrate via the curable adhesive composition; and
   e) allowing the curable adhesive composition to cure.

9. A method according to claim 8, wherein the article is selected from those for use in manufacturing and repairing operations in construction, automotive, aeronautics or aerospace industries.

10. A method according to claim 8, wherein the article and/or the surface comprises a material selected from the group consisting of thermoplastic polymers, metals, composites, and any combinations or mixtures thereof.

11. A method according to claim 8, which does not comprise the step of using a supporting fixture for maintaining the article during the step of adhesively contacting the article to the substrate via the curable adhesive composition.

12. A precursor composition for a curable adhesive which comprises:
   a) a part (A) comprising:
      i. from 20 to 85 wt %, from 40 to 80 wt %, from 50 to 75 wt %, or even from 60 to 75 wt % of a first epoxy curing agent comprising at least one polyether amine and having an amine equivalent weight of at least 45 grams per mole of amine equivalents, based on the weight of the part (A);
      ii. from 1 to 20 wt %, from 4 to 15 wt %, from 8 to 15 wt %, or even from 10 to 15 wt % of a second epoxy curing agent distinct from the first epoxy curing agent, based on the weight of the part (A);
      iii. from 5 to 15 wt %, from 7 to 15 wt %, from 8 to 13 wt %, or even from 9 to 12 wt % of a metal nitrate catalyst, based on the weight of the part (A);
      iv. optionally, from 2 to 12 wt %, from 2 to 10 wt %, from 3 to 9 wt %, or even from 4 to 8 wt % of a metal triflate catalyst, based on the weight of the part (A); and
   b) a part (B) comprising:
      i. from 15 to 70 wt %, from 20 to 65 wt %, from 30 to 60 wt %, or even from 40 to 60 wt % of an epoxy resin, based on the weight of the part (B);
      ii. from 5 to 15 wt %, from 7 to 15 wt %, from 8 to 13 wt %, or even from 9 to 12 wt % of a filler material, based on the weight of the part (B);
      iii. from 10 to 40 wt %, from 15 to 35 wt %, from 15 and 30 wt %, or even from 15 to 25 wt % of an epoxy-based reactive diluent, based on the weight of the part (B); and
      iv. optionally, from 1 to 10 wt %, from 2 to 8 wt %, from 3 and 8 wt %, or even from 4 to 6 wt % of a core-shell polymer toughening agent, based on the weight of the part (B), wherein the amount of filler material is selected such as to provide said part (B) with a hysteresis area of at least 30 Pa×1/s, when measured at 23° C. according to the test method described in the experimental section.

\* \* \* \* \*

UNITED STATES PATENT AND TRADEMARK OFFICE
CERTIFICATE OF CORRECTION

PATENT NO. : 10,647,897 B2  
APPLICATION NO. : 15/770876  
DATED : May 12, 2020  
INVENTOR(S) : Mareike Bardts Page 1 of 1

It is certified that error appears in the above-identified patent and that said Letters Patent is hereby corrected as shown below:

In the Specification

<u>Column 4</u>
Line 15, delete "(+2°" and insert -- (±2° --, therefor.

<u>Column 8</u>
Line 10, delete "phenol-or" and insert -- phenol or --, therefor.
Lines 27-28, delete "dihydroxydiphenylethylphenyl-methane," and
    insert -- dihydroxydiphenylethylphenylmethane, --, therefor.
Lines 29-30, delete "dihydroxydiphenylbutylphenyl-methane," and insert
    -- dihydroxydiphenylbutylphenylmethane, --, therefor.

<u>Column 9</u>
Line 64, delete "Disseldorf," and insert -- Dusseldorf, --, therefor.

<u>Column 18</u>
Line 24, delete "1 mm" and insert -- ≈1 mm --, therefor.
Line 25, delete "≈1 Hz" and insert -- 1 Hz --, therefor.
Line 37, delete "m." and insert -- μm. --, therefor.
Line 60, delete "m." and insert -- μm. --, therefor.

<u>Column 20</u>
Line 40, delete "a" and insert -- A --, therefor.

Signed and Sealed this  
Seventh Day of July, 2020

Andrei Iancu  
*Director of the United States Patent and Trademark Office*